United States Patent
Floessholzer

(10) Patent No.: US 10,959,571 B2
(45) Date of Patent: Mar. 30, 2021

(54) AIR-BASED FRYER

(71) Applicant: KONINKLIJKE PHILIPS N.V., Eindhoven (NL)

(72) Inventor: Hannes Uwe Floessholzer, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 185 days.

(21) Appl. No.: 16/081,108

(22) PCT Filed: Mar. 4, 2017

(86) PCT No.: PCT/IB2017/051274
§ 371 (c)(1),
(2) Date: Aug. 30, 2018

(87) PCT Pub. No.: WO2017/149519
PCT Pub. Date: Sep. 8, 2017

(65) Prior Publication Data
US 2019/0059647 A1  Feb. 28, 2019

(30) Foreign Application Priority Data

Mar. 4, 2016  (CN) .......................... 201620167670.7

(51) Int. Cl.
A47J 37/06 (2006.01)
A47J 36/38 (2006.01)

(52) U.S. Cl.
CPC .......... *A47J 37/0641* (2013.01); *A47J 36/38* (2013.01)

(58) Field of Classification Search
CPC .... A47J 37/0641; A47J 36/38; A47J 37/1209; A47J 37/1219; A47J 37/1223;
(Continued)

(56) References Cited

U.S. PATENT DOCUMENTS 2,527,015 A * 10/1950 Lhota ........................ F24F 3/16
  261/91
4,068,572 A    1/1978 Vogt
(Continued)

FOREIGN PATENT DOCUMENTS

CN       203407931 U    1/2014
WO       9804174 A1     2/1998
(Continued)

OTHER PUBLICATIONS

English translation of WO-2015178563-A1 (Year: 2015).*

*Primary Examiner* — Ibrahime A Abraham
*Assistant Examiner* — Chris Q Liu

(57) ABSTRACT

Embodiments of the present disclosure relate to an air-based flyer, comprising: a food preparation chamber (1); an air moving device (2) for moving air in the food preparation chamber to generate air flow; a heating device (3) for heating the air flow generated by the air moving device (2) so that the heated air flow can heat the food; an air filter (4) adapted for filtering air from the food preparation chamber (1). The air-based flyer according to the present disclosure avoids discharging fume into the surroundings, and can take away water vapor generated upon cooling timely and improve the cooking quality.

17 Claims, 2 Drawing Sheets

(58) Field of Classification Search
CPC .. A47J 37/0664; A47J 37/1266; A47J 37/047;
A47J 37/1257; A47J 37/1285; A47J
36/165; A47J 36/32; A47J 37/06; A47J
37/0623; A47J 37/0629; A47J 37/12;
A47J 37/1252; A47J 37/1271; A47J
37/128; A47J 37/129
USPC ......... 99/403, 408, 330, 339, 348, 447, 325,
99/331, 345, 357, 407, 417, 448, 449;
219/385, 400, 401, 439, 441, 681
See application file for complete search history.

(56) References Cited

U.S. PATENT DOCUMENTS

| | | | |
|---|---|---|---|
| 8,268,176 B2* | 9/2012 | Johnson | B01D 61/14 |
| | | | 210/636 |
| 2005/0223906 A1 | 10/2005 | Xu | |
| 2006/0011071 A1 | 1/2006 | Cho | |
| 2008/0206420 A1* | 8/2008 | McFadden | A23L 5/17 |
| | | | 426/523 |
| 2015/0250134 A1* | 9/2015 | Hicks | A01K 63/06 |
| | | | 119/246 |

FOREIGN PATENT DOCUMENTS

| | | | |
|---|---|---|---|
| WO | 2006038677 A1 | 4/2006 | |
| WO | WO-2015178563 A1 * | 11/2015 | .............. A47J 37/07 |

\* cited by examiner

AIR-BASED FRYER

This application is the U.S. National Phase application under 35 U.S.C. § 371 of International Application No. PCT/IB2017/051274, filed on Mar. 4, 2017, which claims the benefit of International Application No. 2016/20167670.7 filed on Mar. 4, 2016. These applications are hereby incorporated by reference herein.

FIELD OF THE DISCLOSURE

Embodiments of the present disclosure relate to a food producing devices, and particularly to an air-based fryer.

BACKGROUND OF THE DISCLOSURE

An air-based fryer is an appliance capable of using hot air to cook or fry food. The air-based fryer enables hot air to flow over the food to increase heat transfer to the food and thereby reduce the cooking duration.

Prevalence of the air-based fryer in the market benefits from its capability of preparing food with much less oil as compared with conventional oil fryer. However, the already known air-based fryers still cause fume during use, particularly when fatty food is cooked at a temperature of above 140 centigrade degrees. This cooking fume is one of the main drawbacks of the air-based fryer, as it contains tiny particles to pollute air, and therefore causes long-lasting unpleasant fume smell. In addition, the cooking fume generated by the air-based fryer may further trigger the sending of an alarm of a fume detector or an air purifier.

SUMMARY OF THE DISCLOSURE

According to an embodiment of the present disclosure, there is provided an air-based fryer comprising: a food preparation chamber; an air moving device for moving air in the food preparation chamber to generate air flow; a heating device for heating the air flow generated by the air moving device so that the heated air flow can heat the food; an air filter adapted for filtering air from the food preparation chamber.

According to an embodiment of the present disclosure, the air filter comprises a liquid tank and a porous section located below a liquid level inside the liquid tank, and the food preparation chamber has an air outlet which is in fluid communication with a space below, or more generally upstream of the porous section of the liquid tank through a first tube so that air from the food preparation chamber entering the liquid tank rises above the liquid level after flowing through the porous section.

According to an embodiment of the present disclosure, the air-based fryer further comprises an air pumping device, and the liquid tank further has an air outlet above the liquid level which is in fluid communication with the air pumping device to build negative pressure in the space above the liquid level of the liquid tank through the air pumping device.

According to an embodiment of the present disclosure, the air pumping device is in fluid communication with the surroundings so that the filtered air from the air outlet is at least partially discharged into the surroundings.

According to an embodiment of the present disclosure, the air pumping device is in fluid communication with the food preparation chamber so that the filtered air from the air outlet is at least partially circulated into the food preparation chamber.

According to an embodiment of the present disclosure, the porous section is an element having a plurality of holes to allow air flow only through the holes, and the diameter of the holes is smaller than 2 mm.

According to an embodiment of the present disclosure, the liquid tank is detachably connected to the food preparation chamber.

According to an embodiment of the present disclosure, the air pumping device and the air moving device are driven by the same actuator.

According to an embodiment of the present disclosure, the air moving device is adapted to create an air circulation path in the food preparation chamber, the heating device is located in the circulation path so as to heat the air moving in the circulation path.

According to an embodiment of the present disclosure, in the food preparation chamber is provided a food receiving structure having an air permeable bottom, a top opening and sidewalls, the air moving device and the heating device are located in the vicinity of the top opening of the food receiving structure such that the circulation path is created by the air moving device in such a way that air comes into the food receiving structure from the air permeable bottom of the food receiving structure, and exits the food receiving structure from the top opening of the food receiving structure, and then moves along the sidewalls of the food receiving structure to the air permeable bottom of the food receiving structure.

By providing an air filter to filter pollutants such as oil, vapor, fume particles and food debris in air generated when food is cooked, the air-based fryer according to embodiments of the present disclosure does not discharge odorous polluted air to the surroundings upon operation and improves comfort in use of the air-based fryer; furthermore, when the air-based fryer operates, the air filter can filter away vapor generated in the food preparation chamber in time, thereby facilitating cooking food of high-water-content.

BRIEF DESCRIPTION OF DRAWINGS

The above and other objectives and characteristics of the present disclosure will be made more apparent in combination with the following detailed description of the figures, wherein.

Throughout the above figures, the same reference signs will be understood as designating the same, like or corresponding features or functions.

DETAILED DESCRIPTION OF PREFERRED EMBODIMENTS

Now reference is made to embodiments of the present disclosure. One or more examples of embodiments are shown in the figures. Embodiments are provided by illustrations of the present disclosure, and are not intended to limit the present disclosure. For example, features shown or described as a portion of an embodiment might be used in another embodiment to generate further embodiments. The present disclosure is intended to include these and other modification and variations falling within the scope and spirit of the present disclosure.

Figure 1:
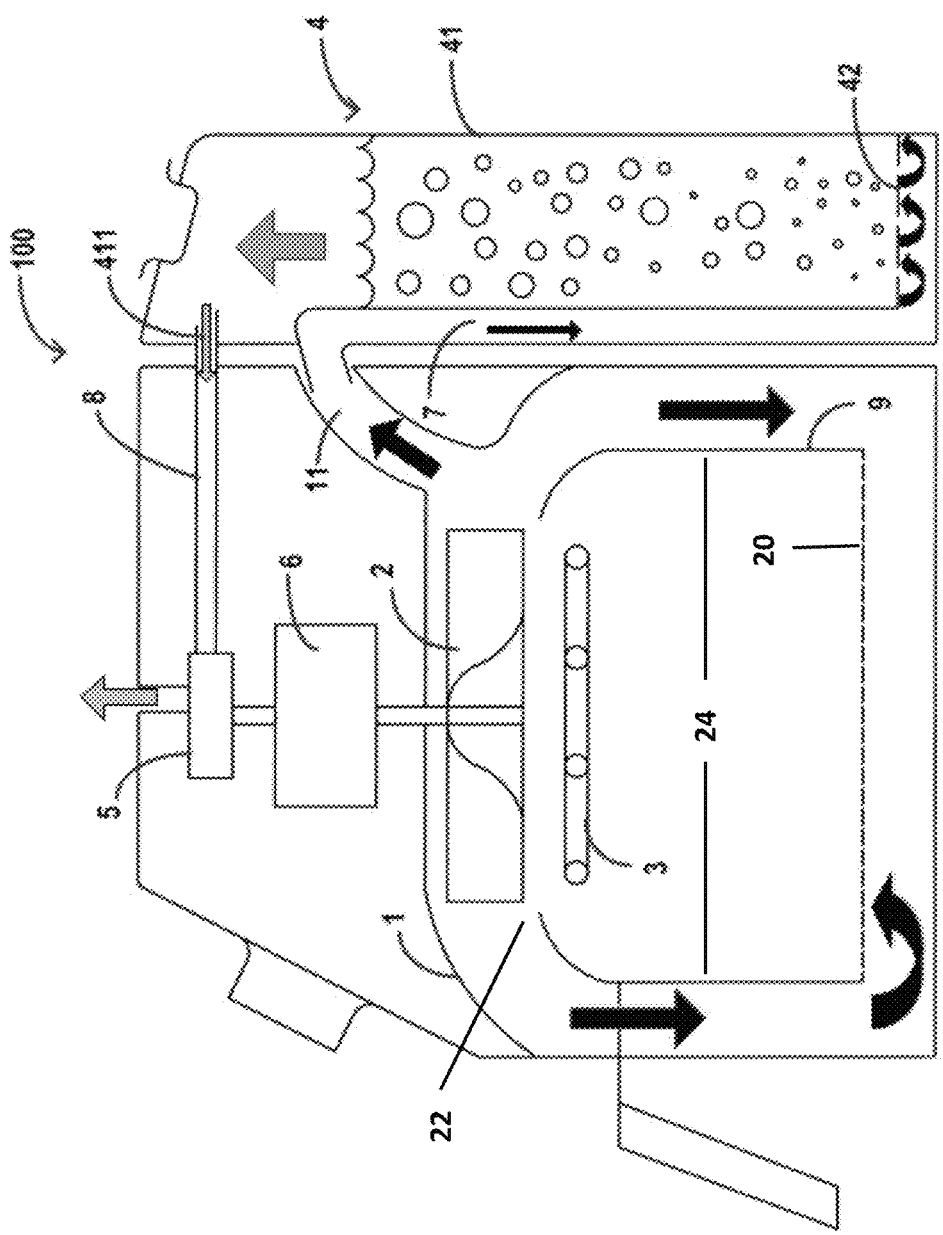
FIG. 1 is a schematic view of an air-based fryer according to a first embodiment of the present disclosure.

FIG. 1 shows an air-based fryer 100 according to a first embodiment of the present disclosure. The air-based fryer 100 comprises a food preparation chamber 1, an air moving device 2 and a heating device 3. The air moving device 2 moves air in the food preparation chamber 1 to generate air flow. The heating device 3 heats the air flow generated by the air moving device 2 so that the heated air flow can heat the food upon flowing by the food in the food preparation chamber 1.

The air moving device 2 may be a fan disposed at a center of the top of the food preparation chamber 1 and driven by an actuator 6. The fan pumps air towards the top of the food preparation chamber 1, and the air, after reaching the top of the food preparation chamber 1, moves along a top wall of the food preparation chamber 1 towards sidewalls of the food preparation chamber 1, then moves along the sidewalls downwards the food preparation chamber 1, and then converges at a center of the bottom of the food preparation chamber 1 and then is pumped upwardly again by the fan to form an air circulation path in the food preparation chamber 1. The heating device 3 may be disposed below the air moving device 2, namely, located in the air circulation path, so that while air is being pumped upwardly by the air moving device 2, air is first heated by the heating device 3 below the air moving device 2. The heated air is circulated through the food in the food preparation chamber 1 to transfer the heat to the food to cook the food.

A food receiving structure 9 may be provided in the food preparation chamber 1. The food receiving structure 9 may have a mesh-like air permeable bottom 20, a top opening 22 and sidewalls 24. The air moving device 2 and the heating device 3 may be located in the vicinity of the top opening of the food receiving structure 9. As such, when food is received in the food receiving structure 9, the circulation path is created by the air moving device 2 in a way that air comes into the food receiving structure 9 from the air permeable bottom of the food receiving structure 9, and passes by the food from bottom to top and then exits the food receiving structure 9 from the top opening of the food receiving structure 9, and then moves along the sidewalls of the food receiving structure 9 to the air permeable bottom of the food receiving structure 9. The sidewalls of the food receiving structure 9 functions as guiding effect to guide air to circulate downwardly from outside of the food receiving structure 9 and circulate upwardly in the food receiving structure 9, and the air permeable bottom thereof facilitates more hot air passing by the bottom of the food to allow the food completely in the air circulation path. Hence, the food receiving structure 9 improves establishment of the air circulation path and improves the efficiency and uniformity of heating of the food by air.

The air-based fryer 100 further comprises an air filter 4. The air filter 4 comprises a liquid tank 41 and a porous section 42 located in the liquid tank 41. The liquid tank 41 is filled with liquid such as water. The porous section 42 is located below a level of liquid in the liquid tank 41. The food preparation chamber 1 has an air outlet 11 which is in fluid communication with a space in the liquid tank 41 below the porous section 42 via a first tube 7.

The air-based fryer 100 further comprises an air pumping device 5 such as a diaphragm pump. The air pumping device 5 may be actuated by a separate actuating mechanism or it may, together with the air moving device 2, be driven by the same actuator 6. The liquid tank 41 further has an air outlet 411 above the liquid level. The air outlet 411 is in fluid communication with the air pumping device 5 through a second tube 8. The air pumping device 5 is further in fluid communication with the surroundings.

When the air-based fryer 100 is in operation, the air pumping device 5 is actuated to pump air from a space in the liquid tank 41 above the liquid level to the surroundings through the air outlet 411 and the second tube 8, thereby creating a negative pressure in the space in the liquid tank 41 above the liquid level. This forces hot air in the food preparation chamber 1 to at least partially enter the liquid in the liquid tank 41 below the porous section 42 through the air outlet 11 and the first tube 7. The porous section 42 may be an element having a plurality of pores, and partitions the liquid in the liquid tank 41 into an upper portion and a lower portion. Air entering the liquid below the porous section 42 is only permitted to float into the liquid above the porous member 42 through pores in the porous section 42.

Upon entering the liquid in the liquid tank 41, the hot air from the food preparation chamber 1 is quickly cooled by the colder liquid, so that cooking oil and water vapor entrained in the hot air condense and stay in the liquid in the liquid tank 41. Meanwhile, fume particles and food debris in the hot air also remain in the liquid in the liquid tank 41. When air passes through the pores in the porous section 42, large air bubbles are divided by the porous section 42 into innumerable tiny bubbles. This increases contact area between the air and the liquid and the porous section as well as a stay duration of the air in the liquid, thereby improving the capability of the liquid and the porous section 42 of condensing and adsorbing oil, water, fume particles and food debris and the like in the air. Bubbles after passing through the porous section 42 float straight upwardly to above the liquid level of the liquid tank 41, thereby being filtered and purified by the air filter 4 before being discharged. The purified air above the liquid level of the liquid tank 41 is pumped by the air pumping device 5 to the surroundings through the air outlet 411 and the second tube 8, whereupon the air would not damage the air pumping device 5 due to high temperature since the air has already been cooled by the air filter 4.

In this way, the air discharged into the surroundings almost does not contain pollutants such as oil, water, fume particles and food debris any longer, so the air-based fryer 100 does not discharge odorous fume any more, nor does it pollute the surroundings. Fresh air from the surroundings may enter the food preparation chamber 1 for example through the air inlet of the air-based fryer 100 to replenish air.

To enable the stay duration of the air in the liquid as long as possible to improve the effect of said air being filtered by the liquid, it is favorable to dispose the porous section 42 as adjacent to the bottom of the liquid tank 41 as possible. As such, innumerable tiny bubbles divided by the porous section 42 can stay in the liquid for a longer time period during rising so that more pollutants are adsorbed by the liquid. In addition, a diameter of pores of the porous section 42 may be as small as possible, preferably smaller than 2 mm, to reduce the size of the bubbles passing through the porous section 42 for increasing the contact area between the air and the liquid and the porous section 42, so as to improve the effect of absorbing the pollutants in the air.

Figure 2:
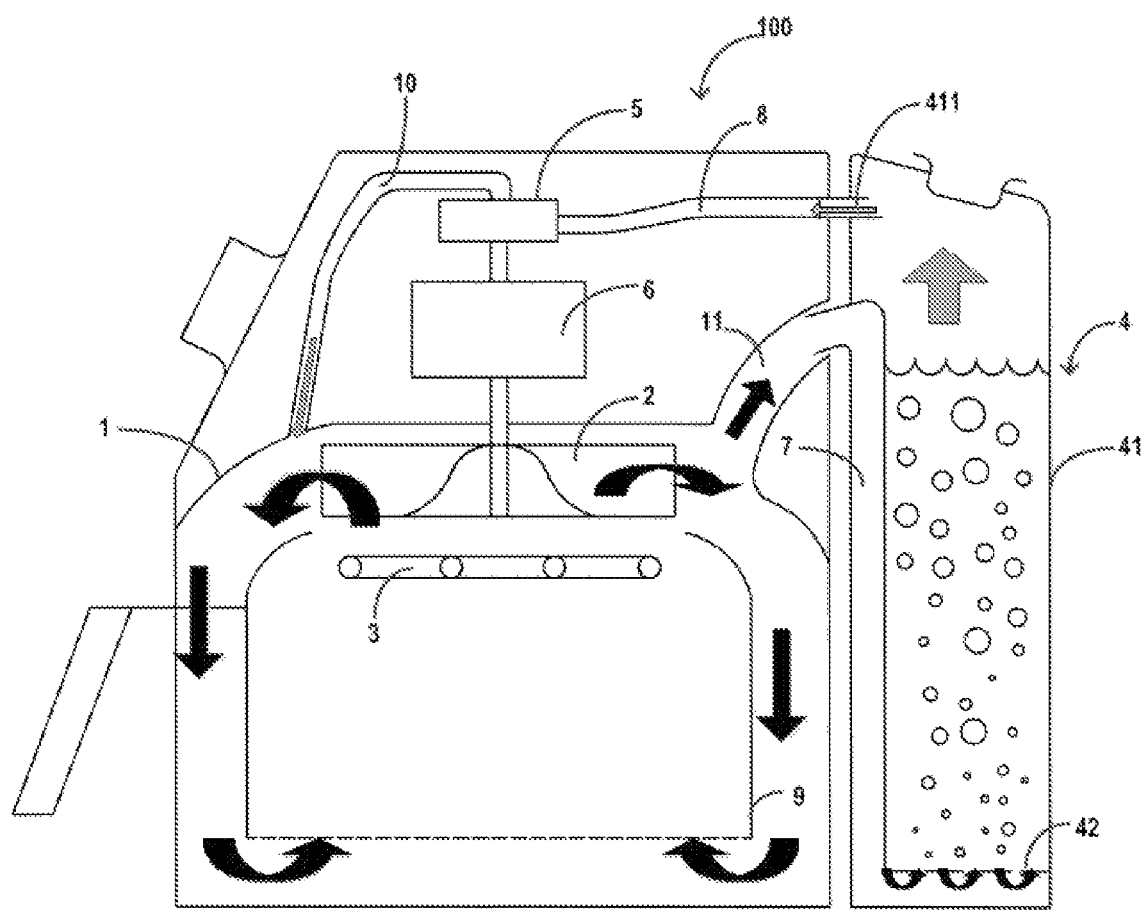
FIG. 2 is a schematic view of an air-based fryer according to a second embodiment of the present disclosure.

FIG. 2 shows an air-based fryer 100 according to a second embodiment of the present disclosure. Contrary to the first embodiment shown in FIG. 1, the air pumping device 5 of the air-based fryer 100 in the second embodiment is not in communication with the surroundings, but in fluid communication with the food preparation chamber 1 through a third tube 10. After the air from the food preparation chamber 1 is filtered and purified by the air filter 4, it is pumped back into the food preparation chamber 1 by the air pumping device 5 through the air outlet 411, the second tube 8 and the third tube 10, and then participates in the circulation and the heating again to cook the food. The air that is returned into the food preparation chamber 1 does almost not contain pollutants such as oil, water, fume particles and food debris any more, such that the air in the food preparation chamber 1 is purified and introduction of fresh air from the surroundings is not needed. Taking away vapor in the food preparation chamber 1 by the air filter 4 particularly facilitates cooking food containing larger water content (e.g., frozen food).

After the air filter 4 operates for a time period, the liquid in the liquid tank 41 might have already adsorbed a lot of pollutants such as oil and particles, causing the filtering capability to decline. For this reason, the liquid tank 41 of the air filter 4 may be arranged to be detachably connected to the food preparation chamber 1. As such, when necessary, the liquid tank 41 can be detached from the food preparation chamber 1, and polluted liquid in the liquid tank 41 can be poured out and clean liquid can be refilled for use next time. A cycle of replacing the liquid in the liquid tank 41 may be decided by the user, or, a controller of the air-based fryer 100 may prompt the user according to the number of times of cooking. For example, it is feasible that after cooking for one to five times, the user replaces the liquid initiatively, or the controller of the air-based fryer 100 reminds the user to replace the liquid after a count of cooking times reaches one to five times.

The amount of liquid filled in the liquid tank 41 depends on factors such as cooking duration, air temperature, size and number of bubbles. The longer the cooking duration is, the higher the air temperature is, the quicker the liquid is heated by air, and therefore more liquid is needed. The larger the size of the bubbles generated by the porous section 42 is, the smaller the number of bubbles is, and more liquid is needed to improve the stay duration of the air in the liquid to meet the filtering requirements.

A rate of pumping air by the air pumping device 5 depends on the size of the food preparation chamber 1 and the cooking type. If the food preparation chamber 1 is larger and/or more pollutants are produced during cooking, a larger air pumping rate is needed to meet the air filtering requirements, and if the case is on the contrary, a smaller air pumping rate may be provided. Usually, an air pumping rate of 1 liter/second is enough.

The porous section 42 may have various forms. For example, the porous section 42 may be a porous material traversing the cross section of the liquid tank 41, or a porous material directly located at an end of the first tube 7 extending into the liquid tank 41. As long as the porous section 42 is located in the liquid of the liquid tank 41 and located in the only path of the air passing from the food preparation chamber 1 to above the liquid level in the liquid tank 41, it can be ensured that the air from the food preparation chamber 1 into the liquid tank 41 passes through the porous section 42 first and then rises to above the liquid level, ensuring being filtered upon divided into tiny bubbles by the porous section 42.

It should be appreciated that the above embodiments illustrate the principle of the present disclosure, but is not intended to limit the scope of the present disclosure; and it should be appreciated by those skilled in the art that medications and variations may be adopted without departing from the spirit and scope of the present disclosure. These modifications and variations are considered in the scope of the present disclosure and the appended claims. The protection scope of the present disclosure is defined by the appended claims. In addition, any reference sign in claims should not be construed as limiting the claims. Use of the verb "comprise" and its variants does not exclude existence of elements or steps besides those recited in claims. The indefinite articles "a" or "an" preceding an element or step does not exclude existence of a plurality of such elements.

The invention claimed is:

1. An air-based fryer, comprising
a food preparation chamber;
an air moving device for moving air in the food preparation chamber to generate air flow;
a heating device for heating the air flow generated by the air moving device so that the heated air flow can heat food that in use may be received in the food preparation chamber;
a liquid based air filter adapted to filter air from the food preparation chamber, the liquid based air filter comprising a liquid tank comprising an air outlet above a liquid level, wherein the food preparation chamber has an air outlet which is in fluid communication with the liquid tank so that air from the food preparation chamber entering the liquid tank rises above the liquid level in the liquid tank; and
an air pumping device, wherein the air outlet is disposed above the liquid level and is in fluid communication with the air pumping device to build negative pressure in a space above the liquid level in the liquid tank through the air pumping device.

2. The air-based fryer according to claim 1, wherein the air pumping device is in fluid communication with surroundings so that filtered air from the air outlet is at least partially discharged into the surroundings.

3. The air-based fryer according to claim 1, wherein the air pumping device is in fluid communication with the food preparation chamber so that filtered air from the air outlet is at least partially circulated into the food preparation chamber.

4. The air-based fryer according to claim 1, wherein the liquid tank is detachably connected to the food preparation chamber.

5. The air-based fryer according to claim 1, wherein the air moving device is adapted to create an air circulation path in the food preparation chamber, and the heating device is located in the air circulation path so as to heat the air moving in the air circulation path.

6. The air-based fryer according to claim 1, wherein in the food preparation chamber is provided a food receiving structure having an air permeable bottom, a top opening and sidewalls, the air moving device and the heating device are located in a vicinity of the top opening of the food receiving structure such that a circulation path is created by the air moving device in such a way that air comes into the food receiving structure from the air permeable bottom of the food receiving structure, and exits the food receiving structure from the top opening of the food receiving structure, and then moves along the sidewalls of the food receiving structure to the air permeable bottom of the food receiving structure.

7. The air-based fryer according to claim 1, wherein the air filter comprises a porous section located below the liquid level in the liquid tank.

8. The air-based fryer according to claim 7, wherein the air outlet is in fluid communication with a space of the liquid tank upstream of the porous section so that air from the food preparation chamber flows through the porous section.

9. The air-based fryer according to claim 7, wherein the porous section comprises an element having a plurality of holes to allow air flow only through the holes.

10. An air-based fryer, comprising
a food preparation chamber;
an air moving device for moving air in the food preparation chamber to generate air flow;
a heating device for heating the air flow generated by the air moving device so that the heated air flow can heat food that in use may be received in the food preparation chamber;
a liquid based air filter comprising a liquid tank detachably connected to the food preparation chamber, the liquid based air filter being adapted to filter air from the food preparation chamber, wherein the food preparation chamber has an air outlet which is in fluid communication with the liquid tank so that air from the food preparation chamber entering the liquid tank rises above a liquid level in the liquid tank; and
an air pumping device, wherein the air pumping device and the air moving device are driven by a same actuator, and the liquid tank further comprises has an air outlet above the liquid level, which is in fluid communication with the air pumping device to build negative pressure in a space above the liquid level in the liquid tank through the air pumping device.

11. The air-based fryer according to claim 10, wherein the air pumping device is in fluid communication with surroundings so that filtered air from the air outlet is at least partially discharged into the surroundings.

12. The air-based fryer according to claim 10, wherein the air pumping device is in fluid communication with the food preparation chamber so that filtered air from the air outlet is at least partially circulated into the food preparation chamber.

13. The air-based fryer according to claim 10, wherein the air filter comprises a porous section located below the liquid level in the liquid tank, and the porous section comprises an element having a plurality of holes to allow air flow only through the holes.

14. The air-based fryer according to claim 13, wherein the holes have a diameter smaller than 2 mm.

15. The air-based fryer according to claim 10, wherein the liquid tank is detachably connected to the food preparation chamber.

16. The air-based fryer according to claim 10, wherein the air moving device is adapted to create an air circulation path in the food preparation chamber, the heating device is located in the air circulation path so as to heat the air moving in the circulation path.

17. The air-based fryer according to claim 10, wherein the air moving device is adapted to create an air circulation path in the food preparation chamber, and the heating device is located in the air circulation path so as to heat the air moving in the circulation path.

\* \* \* \* \*